(12) United States Patent
Rapka

(10) Patent No.: US 10,848,248 B2
(45) Date of Patent: *Nov. 24, 2020

(54) METHODS AND SYSTEMS FOR MULTI-LEVEL BEACON TONE MODULATION OF AN OPTICAL DATA SIGNAL

(71) Applicant: LGS Innovations LLC, Herndon, VA (US)

(72) Inventor: James Richard Rapka, Manalapan, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/434,641

(22) Filed: Jun. 7, 2019

(65) Prior Publication Data

US 2019/0288776 A1    Sep. 19, 2019

Related U.S. Application Data

(63) Continuation of application No. 15/842,034, filed on Dec. 14, 2017, now Pat. No. 10,367,585.

(51) Int. Cl.
  *H04B 10/516* (2013.01)
  *H04B 10/077* (2013.01)
  *H04B 10/556* (2013.01)
  *H04B 10/118* (2013.01)

(52) U.S. Cl.
  CPC ......... *H04B 10/516* (2013.01); *H04B 10/077* (2013.01); *H04B 10/118* (2013.01); *H04B 10/556* (2013.01); *H04B 2210/075* (2013.01)

(58) Field of Classification Search
  None
  See application file for complete search history.

(56) References Cited

U.S. PATENT DOCUMENTS

| | | |
|---|---|---|
| 5,610,748 A | 3/1997 | Sakanaka et al. |
| 6,473,219 B1 | 10/2002 | King |
| 6,810,159 B2 | 10/2004 | Olesen |
| 9,252,889 B2 | 2/2016 | Christensen |
| 2010/0316389 A1 | 12/2010 | Walewski |
| 2017/0339695 A1 | 11/2017 | Wang et al. |

*Primary Examiner* — Casey L Kretzer
(74) *Attorney, Agent, or Firm* — Baker & Hostetler LLP

(57) ABSTRACT

Methods and systems are described for communicating an optical data signal. An example method may comprise receiving data. The example method may comprise modulating the data to generate a modulated data signal. The modulated data signal may comprise a first level modulated with a first beacon tone and a second level modulated with a second beacon tone. The second level may be modulated in phase with the first level. The method may comprise transmitting an optical signal comprising the modulated data signal.

20 Claims, 9 Drawing Sheets

US 10,848,248 B2

METHODS AND SYSTEMS FOR MULTI-LEVEL BEACON TONE MODULATION OF AN OPTICAL DATA SIGNAL

CROSS-REFERENCE TO RELATED APPLICATIONS

This application is a continuation of U.S. patent application Ser. No. 15/842,034 filed Dec. 14, 2017, the disclosure of which is hereby incorporated by reference in its entirety.

BACKGROUND

Optical data signals in free space optical communication systems are typically modulated by out-of-band beacon tones to allow mechanical systems to properly align the free space optical transceivers. Typically, only a single data signal level (the "high" data signal level) is modulated with the beacon tone. However, the beacon tone may be difficult to filter out thereby limiting the usefulness of the data signal. Accordingly, there is a need for better modulating techniques for transmitting optical data signals.

SUMMARY

Systems and methods are described for communication of an optical signal. An example method may comprise receiving a data signal comprising a first level indicative of an upper end of a power range of the data signal and a second level indicative of a lower end of the power range of the data signal. The method may comprise modulating the data signal to generate a modulated data signal. The modulated data signal may comprise the first level modulated with a first beacon tone and the second level modulated with a second beacon tone. The second level may be modulated in phase with the first level. The method may comprise transmitting an optical signal comprising the modulated data signal.

In an aspect, an example device may comprise a modulator configured to receive a data signal comprising a first level indicative of an upper end of a power range of the data signal and a second level indicative of a lower end of the power range of the data signal. The modulator may be configured to modulate the data signal to generate a modulated data signal. The modulated data signal may comprise the first level modulated with a first beacon tone and the second level modulated with a second beacon tone. The second level may be modulated in phase with the first level. The device may comprise an optical terminal configured to transmit an optical signal comprising the modulated data signal.

In an aspect, an example system may comprise an optical transmitter configured to receive a data signal comprising a first level indicative of an upper end of a power range of the data signal and a second level indicative of a lower end of the power range of the data signal. The optical transmitter may be configured to modulate the data signal to generate a modulated data signal. The modulated data signal may comprise the first level modulated with a first beacon tone and the second level modulated with a second beacon tone. The second level may be modulated in phase with the first level. The optical transmitter may be configured to transmit an optical signal comprising the modulated data signal. The system may comprise an optical receiver configured to receive the optical signal and filter one or more of the first beacon tone or the second beacon tone from the optical signal. The first beacon tone may be identical or substantially the same as the second beacon tone. For example, the second beacon tone may be the first beacon tone.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
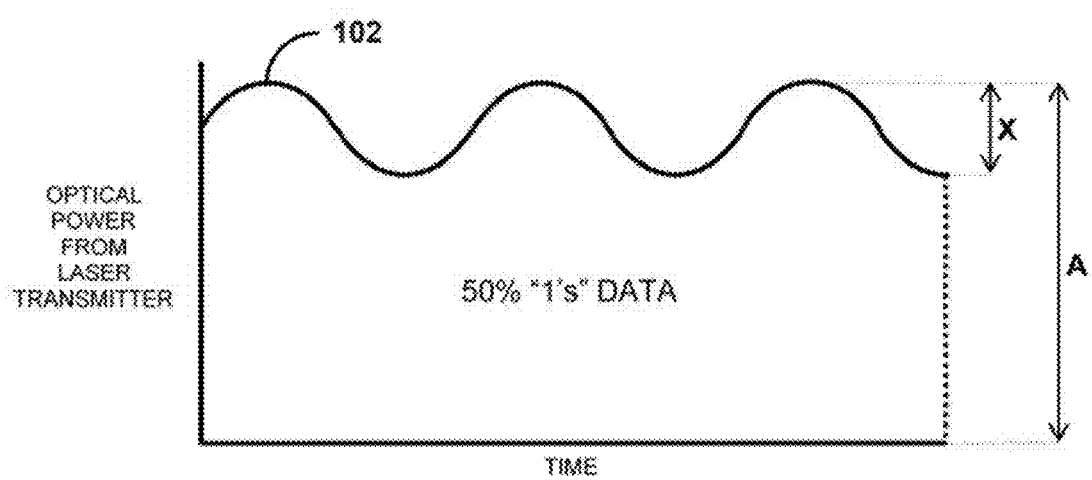
FIG. 1 is graph illustrating example single level modulation of a data signal with a beacon tone.

The present methods and systems relate to an optical communication system, such as a satellite laser communication system. FIG. 1 is graph illustrating an example of a single level (e.g., "high" level) of the optical data signal modulated by a beacon tone. The example signal comprises a first level 102 (e.g., power level). The first level 102 may comprise a high level (e.g., or top level) of an optical signal. The first level 102 may be representative of a beacon tone combined and/or modulated with the data signal. The beacon tone may be used to align a transmitter and a receiver.

A problem with the single level method is that the total optical power level decreases with increasing beacon tone amplitude. Another problem with the single level method is that such approach modulates the bit to bit "swing" of the data signal so that the data receiver sees a bit to bit data "swing" that varies by the peak-to-peak amplitude of the beacon tone. These effects decrease data receiver sensitivity.

Figure 2:
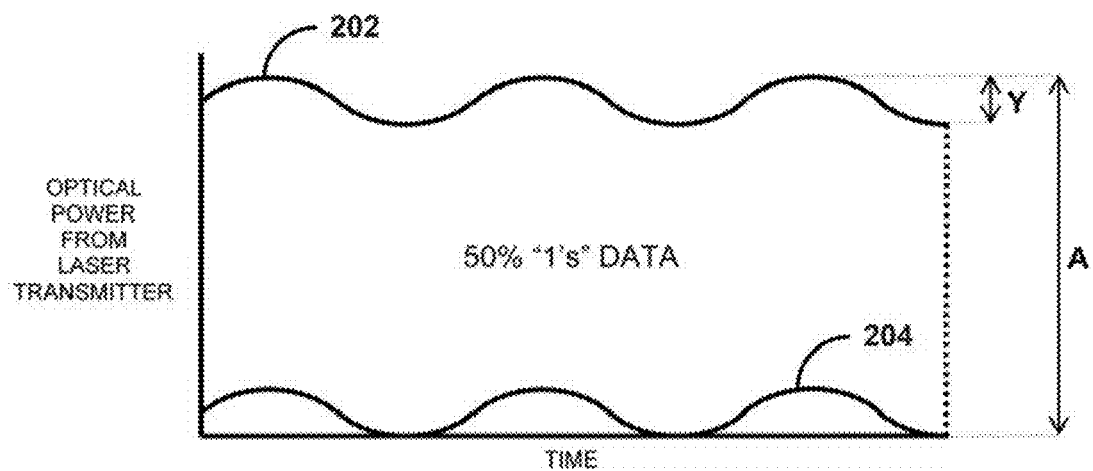
FIG. 2 is a graph illustrating example multi-level modulation of a data signal with a beacon tone.

The present methods and systems disclose an improvement on conventional approaches by using multi-level (e.g., bi-level) modulation. For example, multi-level modulation may comprise modulation of a first level (e.g., high level, top level)) of a data signal and a second level (e.g., low level, bottom level). FIG. 2 is a graph illustrating example multi-level modulation in accordance with the present disclosure.

The data signal 202 may comprise a first level 202 and a second level 204. The first level 202 may be representative of a first beacon tone combined and/or modulated with the data signal. The second level 204 may be representative of a first beacon tone combined and/or modulated with the data signal. The first level 202 may be indicative of an upper end of a power range of the data signal. The second level 204 may be indicative of a lower end of the power range of the data signal. The first level 202 of the data signal may be separated from the second level 204 of the data signal by a fixed direct current voltage bias.

The present approach better utilizes the optical power dynamic range despite the fact that the optical extinction ratio may not be maximized. With multi-level modulation the overall power level of the optical signal may remain the same regardless of the beacon tone amplitude. Also with multi-level modulation the bit to bit "swing" of the data signal may be constant (e.g., or substantially constant, within a threshold level of being constant), which improves data receiver sensitivity. With multi-level modulation the beacon tone may be totally filtered out of the data signal with a high pass filter so that pulse amplitude modulation techniques (PAM-N) can be used to improve the data transmission bit rate.

Figure 3A:
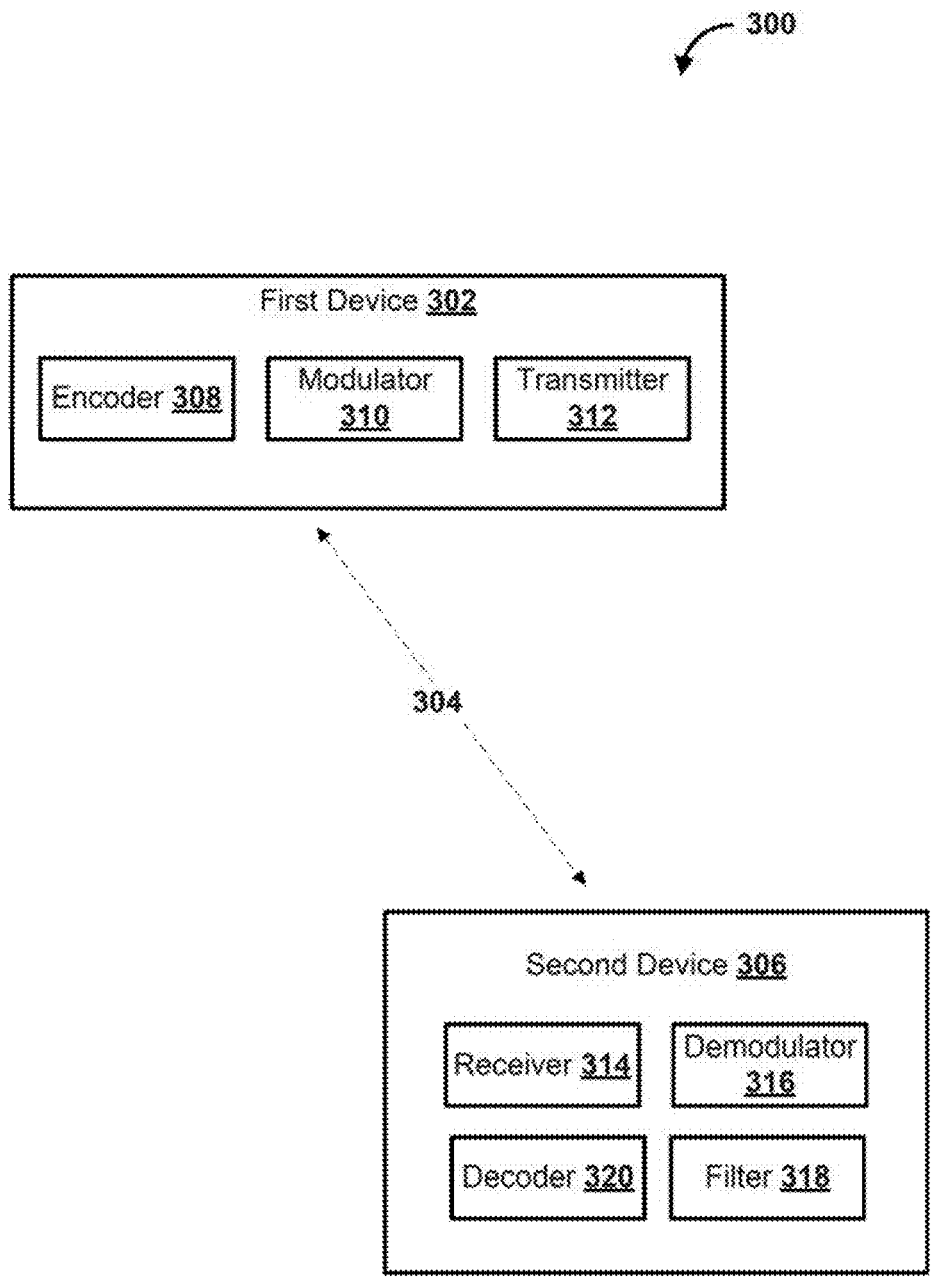
FIG. 3A is a block diagram illustrating an example optical communication system.

FIG. 3 is a block diagram illustrating an example optical communication system. As an example, the optical communication system 300 may comprise a satellite communication system. The system 300 may comprise a first device 302. The first device 302 may be configured to receive and/or transmit a data signal. The first device 302 may be configured to receive data and transmit the data as a data signal. The data signal may comprise an optical data signal. The data signal may be transmitted in a communication channel 304. The communication channel 304 may comprise free space, a transmission line, and/or the like. The data signal may be transmitted to a second device 306.

The first device 302 may be configured to receive data. The data may comprise any type of information, such a media, text, video, images, audio, data files, and/or the like. The data may be received, for example, by any component of the first device 302. The data may comprise a data signal. As another example, the data may comprise a data stream or data file. The data stream or data file may be used to generate a data signal. The data signal may comprise a first level indicative of an upper end of a power range of the data signal. The data signal may comprise a second level indicative of a lower end of the power range of the data signal. The first level of the data signal may be separated from the second level of the data signal by a fixed direct current voltage bias. The first level may correspond to the second level in a time dimension of the data signal. The data signal may be further combined and/or modulated as described herein.

The first device 302 may comprise an encoder 308. The data may be received by the encoder 308. The encoder 308 may transform the data (e.g., or data signal) by encoding, encrypting, and/or otherwise modifying the data. For example, the encoder 308 may generate, based on the data, a plurality of data segments, such as code words. For example, the encoder 308 may segment the data into smaller portions of data to generate the plurality of data segments. The encoder 308 may add information to one or more of the data segments. The information may comprise error correction information, such as one or more parity bits.

The first device 302 may be configured to modulate the data (e.g., or data signal) to generate a modulated data signal. The first device 302 may comprise a modulator 310 configured to generate the modulated data signal. The modulator 310 may receive the data (e.g., or data signal) from the encoder 308. For example, the modulator 310 may receive the plurality of data segments from the encoder 308. The modulator 310 may generate, based on one or more of the plurality of data segments, a plurality of data symbols (e.g., or a mathematical representation of a symbol). A symbol may be a waveform, a state, or a significant condition of a communication medium that persists, for a fixed period of time. For example, the modulator 310 may map one or more bits of the plurality of data segments to corresponding symbol values, such as amplitude values, frequency values, and/or the like.

The modulated data signal may comprise the first level modulated with a first beacon tone. The modulated data signal may comprise the second level modulated with a second beacon tone. The first beacon tone and the second beacon tone may be the same. For example, the second beacon tone may be the first beacon tone or may comprise the first beacon tone with a modified amplitude (e.g., added or subtracted DC offset). The second beacon tone may be based on (e.g., derived from) the first beacon tone. The first beacon tone and/or second beacon tone may comprise an oscillating signal, such as a sine wave. As a non-limiting example, the first beacon tone and/or the second beacon tone may comprise a sine wave having a frequency of less than about 20 kHz.

For example, the modulator 310 may modulate the data signal with the first beacon tone and/or second beacon tone. The modulator 310 may combine (e.g., add, subtract, multiply) the data (e.g., data signal) with the first beacon tone and/or the second beacon tone to the data. The second level may be modulated in phase with the first level. For example, changes in the power level (e.g., or amplitude) of the first level may match changes in power level of the second level. A total power level of the optical signal may remain constant while an amplitude of one or more of the first beacon tone or the second beacon tone varies. A swing of the optical signal may remain constant while an amplitude of one or more of the first beacon tone or the second beacon tone varies. The first level of the data signal may correspond to the second level of the data signal in a time dimension of the data signal.

The modulator 310 may apply a variety of modulation techniques, such as amplitude modulation, phase modulation, polarization modulation, frequency modulation, and/or the like to the data signal. For example, the modulator 310 may be further configured to apply pulse amplitude modulation to one or more of the data signal, the modulated data signal, or the optical signal. As another example, the modulator 310 may comprise a Mach-Zehnder modulator, a laser driver modulator, and/or the like.

The first device 302 may be configured to transmit an optical signal comprising the modulated data signal. The first device 302 may comprise a transmitter 312. The transmitter 312 may comprise an optical transmitter. The transmitter 312 may receive the symbol values from the modulator 310. The transmitter 312 may cause a physical signal to be generated in a communication channel 304. The physical signal may comprise the modulated data signal. For example, the physical signal may comprise the plurality of data symbols. The physical signal may comprise an optical signal in the communication channel 304. For example, the transmitter 312 may comprise an optical terminal, a light emitting device (e.g., laser, light emitting diode), and/or the like. In an aspect, the transmitter 312 may comprise a laser driver integrated circuit. The modulated data signal may comprise a directly modulated laser.

Modulation of the data signal using the first beacon tone and/or the second beacon tone may depend on the specific transmitter used in an implementation of the disclosure. As a non-limiting example, the transmitter may comprise a laser driver, such as the Maxim MAX3643 Laser Driver, which is described in more detail in a datasheet published by Maxim Integrated, titled "MAX3643 155 Mbps to 2.5 Gbps Burst-Mode Laser Driver," 19-3848; Rev 4; published December 2012, which is herein incorporated by reference in its entirety. One pin (VBSET) on the MAX3643 controls the bias of the laser with a voltage from a digital-to-analog converter (DAC). Another pin (VMSET) on the MAX3643 (VMSET) controls the modulation level of the laser with a voltage from a separate DAC. When the data signal is high, the total current through the laser equals ((VBSET*X1)+(VMSET*X2)), where X1 and X2 are voltage to current conversion factors. When the data signal is low, the total current through the laser is VBSET*X1. To modulate only the high data level with a beacon tone (e.g., first beacon tone), VBSET may be kept constant while the beacon tone with a voltage offset is applied to VMSET. To modulate both the high and low data levels, VMSET may be kept constant while the beacon tone with a voltage offset is applied to VBSET. A different beacon tone (e.g., second beacon tone) can be applied to the high data level if the beacon tone applied to the low data level with VBSET is subtracted out from VMSET before the different beacon tone is applied to VMSET.

The second device 306 may be configured to receive the physical signal. The second device 306 may comprise a receiver 314. The receiver 314 may comprise an optical receiver. The optical receiver may be configured to receive the optical signal (e.g., from the first device). The receiver 314 may comprise a light detection device, such as a photodetector, photodiode, phototransistor, photomultiplier, and/or the like.

The second device 306 (e.g., or optical receiver) may be configured to filter one or more of the first beacon tone or the second beacon tone from the physical signal (e.g., optical signal). The second device 306 may comprise a filter 318. The filter 318 may be configured to filter one or more features of the physical signal. The filter 318 may be configured to filter one or more of the first beacon tone or the second beacon tone from the physical signal. The filter may comprise a circuit element and/or a software filter. The filter may comprise a high pass filter. The high pass filter may be configured to filter out signals below a threshold. The first beacon tone and/or the second beacon tone may have a frequency below the threshold. As a non-limiting example, the filter may comprise a 300 KHz high pass filter.

The second device 306 may comprise a demodulator 316. The demodulator 316 may be configured to map physical wave features (e.g., amplitudes, frequency, and pulse information) to corresponding data values (e.g., 1's and 0's). The demodulator 316 may apply a variety of demodulation techniques mapping data values based on amplitude modulation, phase modulation, polarization modulation, frequency modulation, and/or the like. As an example, the demodulator 316 may be configured to demodulate the physical signal based on pulse amplitude modulation techniques. The second device 306 may comprise a decoder 320. The decoder 320 may be configured to generate data (e.g., or a data stream) based on information from the demodulator 316. For example, the decoder 320 may receive logic values, such as 0's and 1's representing individual data bits from the demodulator 316. As another example, the decoder 320 may receive probability values and/or other soft-decision decoding information, if the decoder 320 performs soft decision decoding. The decoder 320 may use one or more parity bits to determine one or more code words to generate the original data, stream, and/or data signal.

As an illustration, the first device and/or second device may be configured to implement two-level ASK (amplitude-shift keying). Forward error correction (FEC) and scrambling may be performed (e.g., in a field programmable gate array). Higher bit density encoding techniques may also be used, such as four-level pulse amplitude modulation (PAM•4), eight-level pulse amplitude modulation (PAM•8), and/or the like.

Figure 3B:
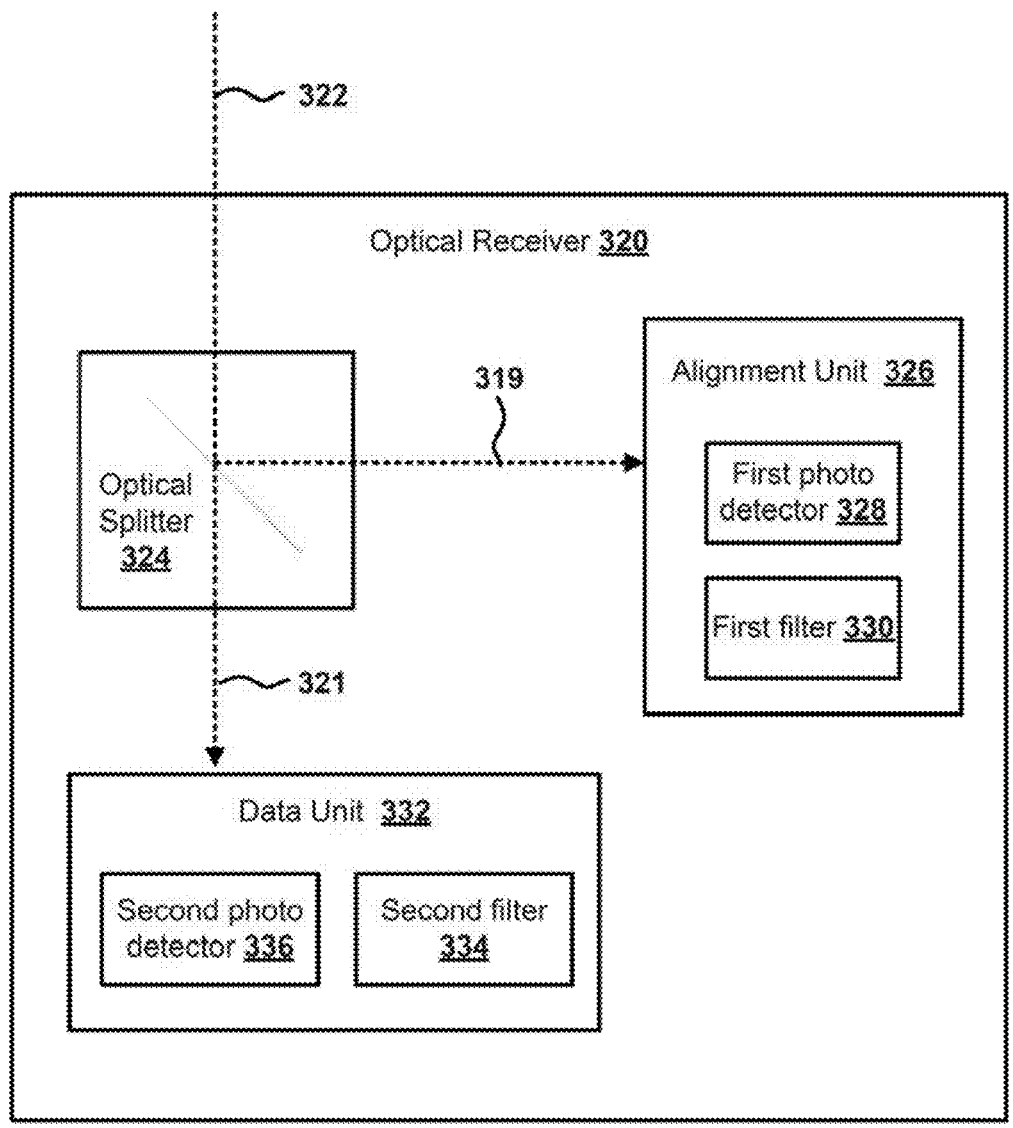
FIG. 3B is a block diagram illustrating an example optical receiver.

FIG. 3B illustrates an example optical receiver 320. The optical receiver 320 may be comprised in the first device 302 and/or the second device 306. The optical receiver 320 may receive an optical signal 322. The optical signal 322 may comprise a modulated data signal (e.g., the physical signal) as described herein. For example, the optical signal 322 may be modulated by one or more of the first beacon tone or the second beacon tone.

The optical receiver 320 may comprise an optical splitter 324. The optical splitter 324 may be configured to split the optical signal into a first beam 319 and a second beam 321. The first beam 319 may be directed (e.g., reflected, transmitted) to an alignment unit 326 configured to align the optical receiver 320 with the optical transmitter (e.g., transmitter 312) sending the optical signal.

The alignment unit 326 may be configured to process the first beacon tone and/or the second beacon tone. The alignment unit 326 may comprise a first photo detector 328 configured to receive the first beam 319. The first photo detector 328 may comprise a quad-photo detector. For example, the first photo detector 328 may comprise a plurality of photo detectors, such as four separate photo detectors (e.g., or regions). Differences in signals from the plurality of photo detectors may be used to determine mechanical adjustments to the optical receiver 320 to improve alignment with the optical transmitter. The alignment unit 326 may also comprise a first filter 330 configured to filter one or more beacon tones (e.g., passing only the one or beacon tones) from the optical signal. The first filter 330 may comprise a bandpass filter configured to pass the one or more beacon tones. As an example, the first filter 330 may comprise a 300 Hz-40 KHz bandpass filter.

As an illustration, the alignment unit 326 may be configured to filter a beacon tone from the optical signal and determines how much laser light is falling on each of the four photodiodes in the Quad Cell Photodiode Detector. Mechanical systems may adjust the orientation of the optical receiver 320 so that an equal amount of light falls on each photodiode of the Quad Cell Photodiode Detector. This adjustment effectively centers the laser beam on Quad Cell Photodiode Detector which also centers the laser light that comes out of the other port of the optical splitter on the photodiode for the optical data.

The optical receiver 320 may comprise a data unit 332 configured to process data signals in the optical signal (e.g., the second beam 321). The optical receiver 302 may be configured to receive the second beam from the optical splitter 324. The data unit 332 may also comprise a second filter 334 configured to filter one or more beacon tones (e.g., removing the beacon tone) from the optical signal. The second filter 334 may comprise a high-pass filter. As an example, the second filter 334 may comprise a 300 KHz High-Pass Filter. The second filter 334 may provide the passed optical signal (e.g., data signal) to second photo detector 336. The second photo detector 336 may generate one or more data signals based on the passed optical signal. The optical receiver 320 may further demodulate and/or decode the data signals.

Figure 4:
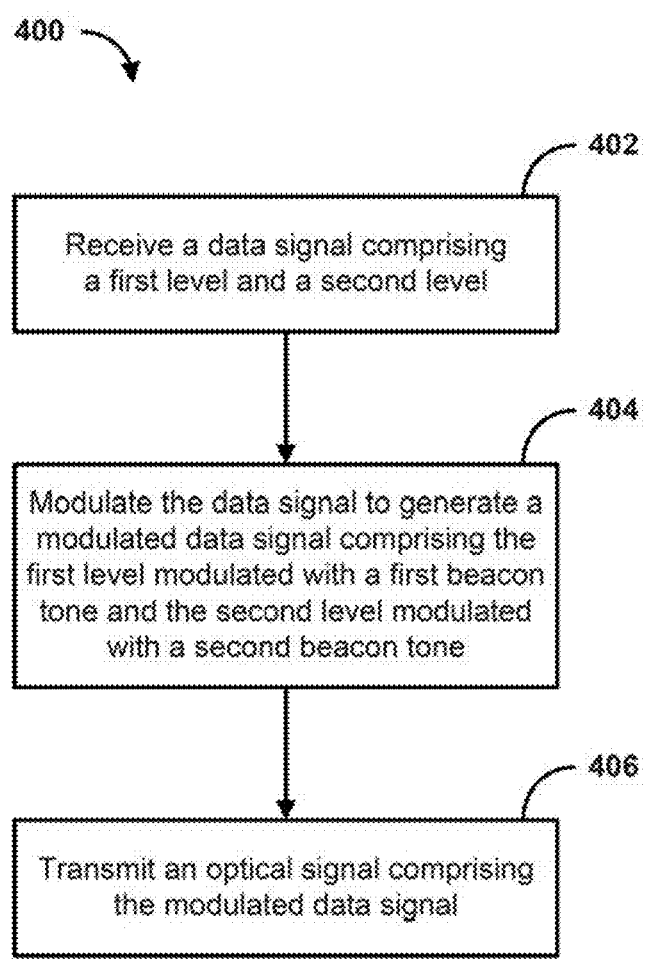
FIG. 4 is a flowchart illustrating an example method of communication.

FIG. 4 is a flowchart illustrating an example method of communication. At step 402, a data signal may be received. The data signal may comprise a first level indicative of an upper end of a power range of the data signal. The data signal may comprise a second level indicative of a lower end of the power range of the data signal. The first level of the data signal may correspond to the second level of the data signal in a time dimension of the data signal. The first level of the data signal may be separated from the second level of the data signal by a fixed direct current voltage bias.

At step 404, the data signal may be modulated to generate a modulated data signal. The modulated data signal may comprise the first level modulated with a first beacon tone. The modulated data signal may comprise the second level modulated with a second beacon tone. The first beacon tone and the second beacon tone may be the same.

The second level may be modulated in phase with the first level. A total power level of the optical signal may remain constant while an amplitude of one or more of the first beacon tone or the second beacon tone varies. A swing of the optical signal may remain constant while an amplitude of one or more of the first beacon tone or the second beacon tone varies.

The method 400 may further comprise applying pulse amplitude modulation to one or more of the data signal, the modulated data signal, or the optical signal.

At step 406, an optical signal comprising the modulated data signal may be transmitted. Transmitting the optical signal may comprise transmitting the optical signal in free space. For example, the optical signal may be transmitted to or from a satellite.

EXAMPLES

A mathematical analysis, circuit simulation results and lab test data are described herein to support the idea that multi-level modulation of the data signal by the beacon tone is an improvement compared to single level modulation.

Returning to FIG. 1 and FIG. 2, an example single level modulated signal is shown in FIG. 1 and an example multi-level modulated signal is shown in FIG. 2. In FIG. 1, "A" represents the entire dynamic range of the laser transmitter and "X" represents the peak-to-peak amplitude of the beacon tone. The advantages of the multi-level modulation technique over the single level modulation technique can be proven with mathematic analysis as follows.

The average power of the single level modulated signal (Psav) is:

$$Psav=0.5*(A-0.5*X)=0.5*A-0.25*X$$

Note that because the "1's" data is only present 50% of the time the power is only half of what the power would be if the data were always "high" (e.g., all "1's").

The average modulation depth of the single level modulated signal (Dsav) is the average single level modulation signal power (Psmav) divided by the total average power (Psav):

$$Dsav=Psmav/Psav=(0.25*X)/(0.5*A-0.25*X)=X/(2*A-X)$$

One measure of performance of the single level modulation technique is the single level data signal minimum amplitude (Psdma) as a function of the modulation depth (Dsav) and the total optical power dynamic range (A) which is:

$$Psdma=A-X=A-((2*A*Dsav)/(Dsav+1))=A*(1-Dsav)/(Dsav+1)$$

Another measure of performance of the single level modulation technique is the single level beacon signal amplitude (Psba) as a function of the modulation depth (Dsav) and the total optical power dynamic range (A) which is:

$$Psba=0.5*X=0.5*((2*A*Dsav)/(Dsav+1))=(A*Dsav)/(Dsav+1)$$

Note that the single level beacon signal amplitude (Psba) is only half of X because the power density of the relatively low frequency (<20 KHz) beacon signal is only 50% due to the 50% "1's" density of the much higher frequency (>10 MHz) data signal. The low pass filter in the beacon receive circuitry effectively converts the 50% "1's" density of the data signal to half the original beacon signal amplitude.

These performance measures will be compared to the corresponding performance measures for the multi-level modulation technique.

In FIG. 2, "A" represents the entire dynamic range of the laser transmitter and "Y" represents the peak-to-peak amplitude of the beacon tone. The advantages of the multi-level modulation technique over the single level modulation technique can be proven with mathematic analysis as follows. The average power of the multi-level modulated signal (Pmlav) is:

$$Pmlav=0.5*(A-Y)+0.5*Y=0.5*A$$

Note that because the "1's" data is only present 50% of the time the power is only half of what the power would be if the data were always "high" (all "1's").

The average modulation depth of the multi-level modulated signal (Dmlav) is the average multi-level modulation signal power (Pmlmav) divided by the total average power (Pmlav):

$$Dmlav=Pmlmav/Pmlav=(0.5*Y)/(0.5*A)=Y/A$$

A measure of performance of the multi-level modulation technique is the multi-level data signal minimum amplitude (Pmldma) as a function of the modulation depth (Dbav) and the total optical power dynamic range (A) which is:

$$Pmldma=A-Y=A-(A*Dmlav)=A*(1-Dmlav)$$

Another measure of performance of the multi-level modulation technique is the multi-level beacon signal amplitude (Pmlba) as a function of the modulation depth (Dmlav) and the total optical power dynamic range (A) which is:

$$Pmlba=Y=A*Dmlav$$

For the same modulation depth (Dav=Dmlav=Dsav) the ratio of the multi-level data signal minimum amplitude (Pmldma) to the single level data signal minimum amplitude (Psdma) should be greater than 1 if the multi-level modulation technique performs better than the single level modulation technique. As shown below, this is the case since the modulation depth (Dav) is always between 0 and 1:

$$Pmldma/Psdma = (A*(1 - Dmlav))/(A*(1 - Dsav)/(Dsav + 1))$$
$$= (A*(1 - Dav))/(A*(1 - Dav)/(Dav + 1))$$
$$= Dav + 1$$

Also, the ratio of the multi-level beacon amplitude (Pmlba) to the single level beacon amplitude (Psdma) should be greater than 1. As shown below, this is also the case.

$$Pmlba/Psba = (A*Dmlav)/((A*Dsav)/(Dsav + 1))$$
$$= (A*Dav)/((A*Dav)/(Dav + 1))$$
$$= Dav + 1$$

What follows are circuit simulation results that confirm the present methods and systems. In the simulations, an example data rate is 250 Mbps, an example data pattern is "10101010", an example beacon tone is 17 KHz and modulation depth (Dav, Dsav and Dmlav) is about 0.16. One of ordinary skill in the art understands that the present methods and systems can be implemented with a variety of data rates, data patterns, beacon tones, and modulation depths.

Figure 5:
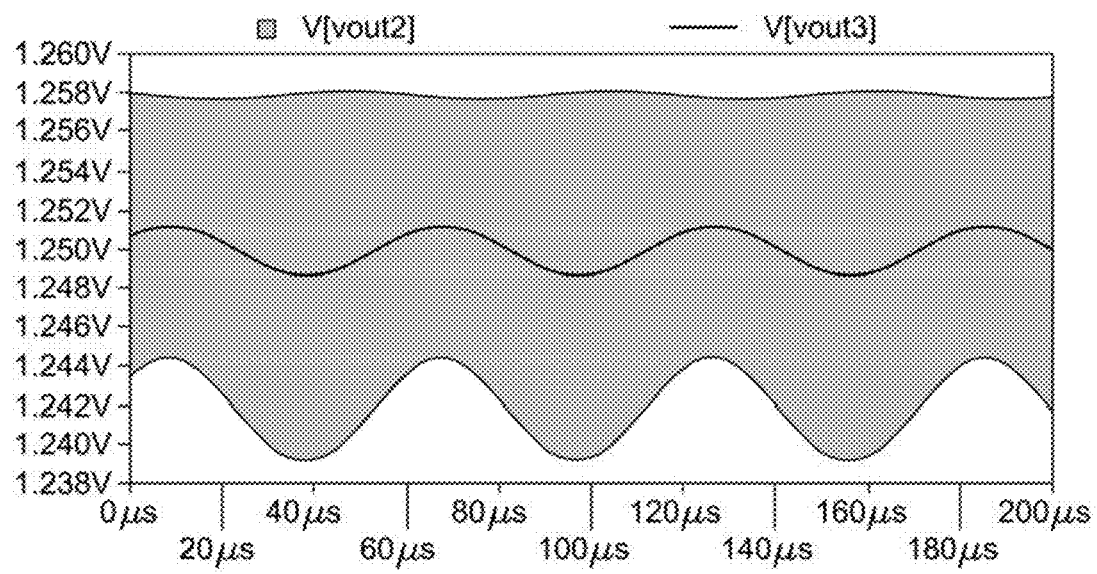
FIG. 5 is a graph illustrating example single level data modulated with a beacon tone which is the electrical output of a simulated optical receiver module.

FIG. 5 is a graph illustrating example single level data modulated with a beacon tone which is the electrical output of a simulated optical receiver module. A beacon tone may be generated from the data signal with a low pass filter (e.g., 1.6 MHz corner frequency). An exemplary beacon tone (V[vout3]) is depicted in FIG. 5 as a dark solid line. The electrical signal is inverted from the optical signal so the bottom level in the graph corresponds to the high level of the optical signal.

Figure 6:
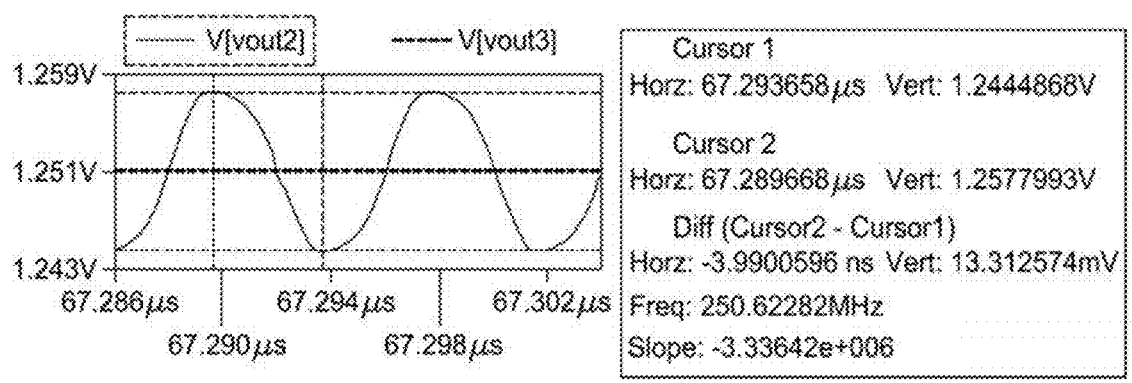
FIG. 6 is a graph illustrating an example single level data minimum amplitude measurement.
Figure 7:
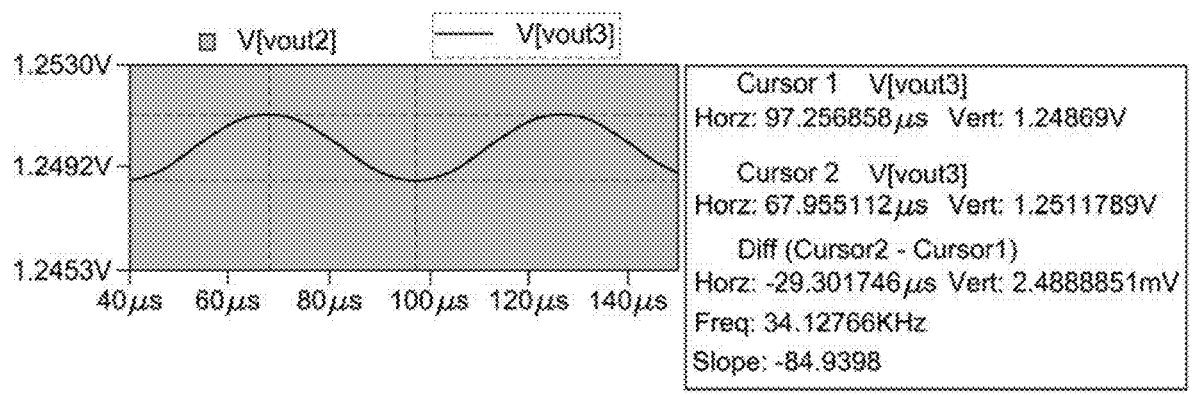
FIG. 7 is a graph illustrating an example the single level beacon tone amplitude measurement.
Figure 8:
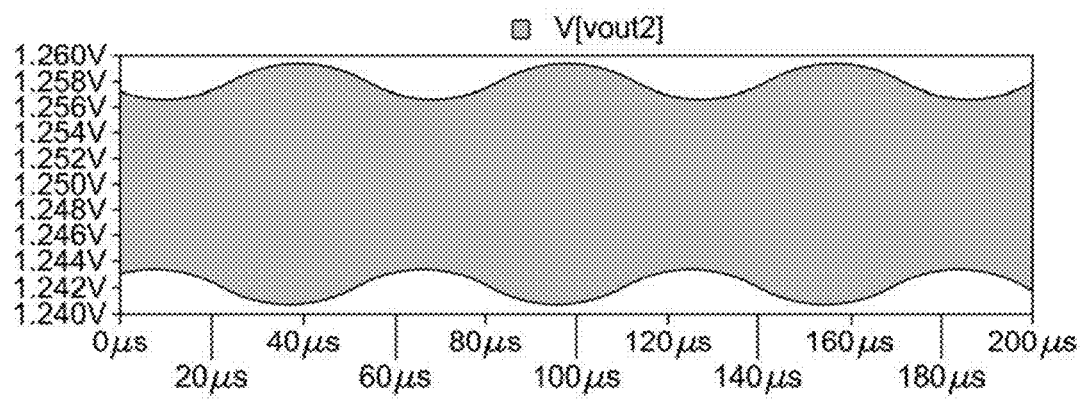
FIG. 8 is a graph illustrating an example single level data signal after going through a high pass filter.

FIG. 6 is a graph illustrating an example single level data minimum amplitude measurement (Psdma). The amplitude measurement is about 13.31 mV. The amplitude measurement is taken at a point where the beacon tone causes the data signal to be at a minimum amplitude. FIG. 7 is a graph illustrating an example the single level beacon tone amplitude measurement (Psba). The amplitude measurement is about 2.49 mV. FIG. 8 is a graph illustrating an example single level data signal after going through a high pass filter. The high pass filter may comprise, for example, a 300 KHz high pass filter. The effects of single level modulation of the data signal cannot be easily filtered out. The variability of the bit to bit "swing" of the data signal remains at the peak-to-peak amplitude of the beacon tone despite the filtering.

Figure 9:
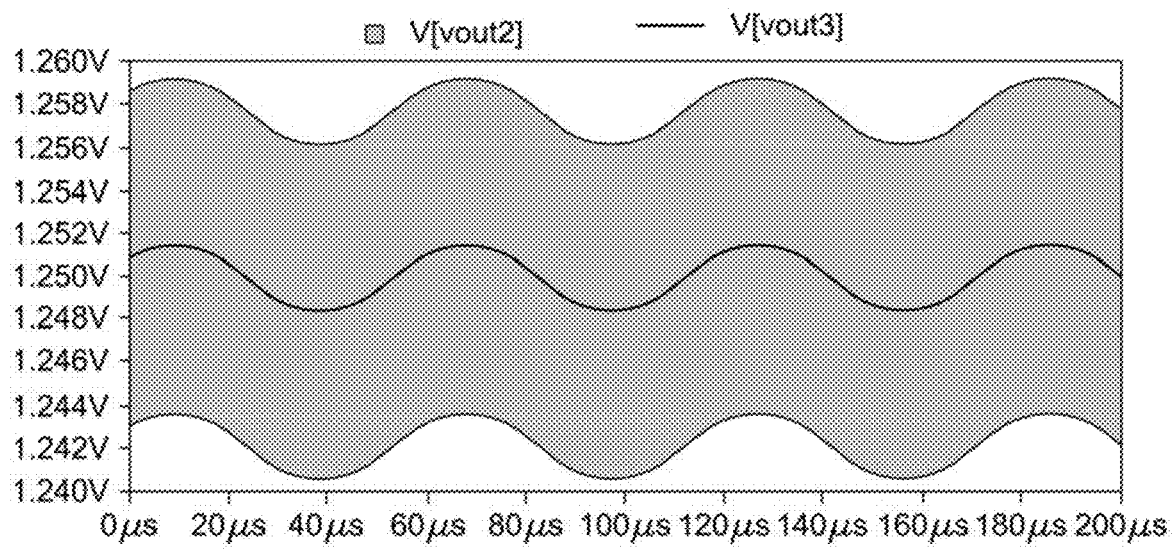
FIG. 9 is a graph illustrating an example multi-level data signal modulated with an example beacon tone which is the electrical output of a simulated optical receiver module.

FIG. 9 is a graph illustrating an example multi-level data signal modulated with an example beacon tone, which is the electrical output of a simulated optical receiver module. An exemplary beacon tone (V[vout3]) is depicted in FIG. 9 as a dark, solid line and may be generated from the data signal with a low pass filter (e.g., 1.6 MHz corner frequency). In comparison to the single level modulated data plot (as shown in FIG. 5) the multi-level modulated data has a constant bit to bit "swing" whereas the bit to bit "swing" of the single level modulated data varies with the beacon tone.

Figure 10:
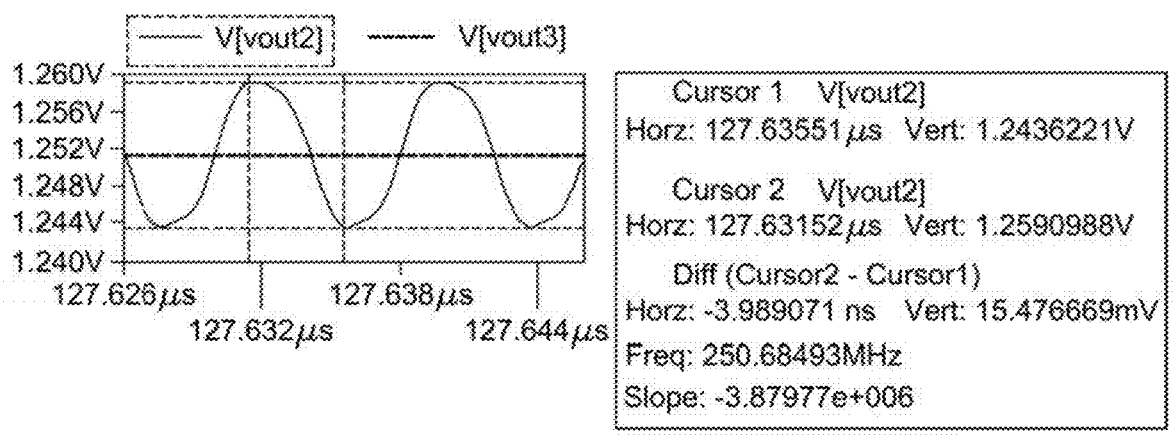
FIG. 10 is a graph illustrating an example multi-level data minimum amplitude measurement.

FIG. 10 is a graph illustrating an example multi-level data minimum amplitude measurement (Pmldma). The amplitude measurement is about 15.48 mV. The ratio of the measured Pmldma of the multi-level data signal to the measured Psdma (FIG. 6) of the single level data signal may be calculated as follows:

(Measured Pmldma)/(Measured Psdma)=15.48 mV/13.31 mV=1.163

The ratio of the Pmldma to the Psdma is about the same as the theoretical ratio for a modulation depth (Dav) of 0.16 which is:

Pmldma/Psdma=Dav+1=0.16+1=1.16

The simulation verifies the theoretical improvement in data signal minimum amplitude by use of the multi-level data modulation technique instead of the single level modulation technique.

Figure 11:
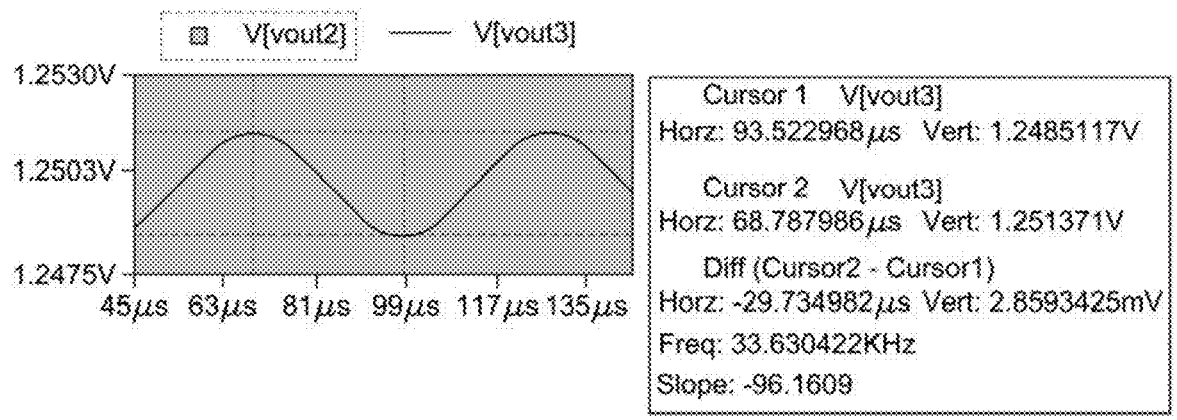
FIG. 11 shows an example multi-level beacon tone amplitude measurement.

FIG. 11 shows an exemplary multi-level beacon tone amplitude measurement (Pmlba). The amplitude measurement is about 2.86 mV. The ratio of the measured Pmlba of the multi-level data signal to the measured Psba (as shown in FIG. 7) of the single level data signal is:

(Measured Pmlba)/(Measured Psba)=2.86 mV/2.49 mV=1.149

The ratio of the measured Pmlba of the double level data signal to the measured Psba of the single level data signal is close to the theoretical ratio for a modulation depth (Dav) of 0.16 which is:

Pmlba/Psba=Dav+1=0.16+1=1.16

The simulation verifies the theoretical improvement in beacon tone amplitude by use of the multi-level data modulation technique instead of the single level modulation technique.

Figure 12:
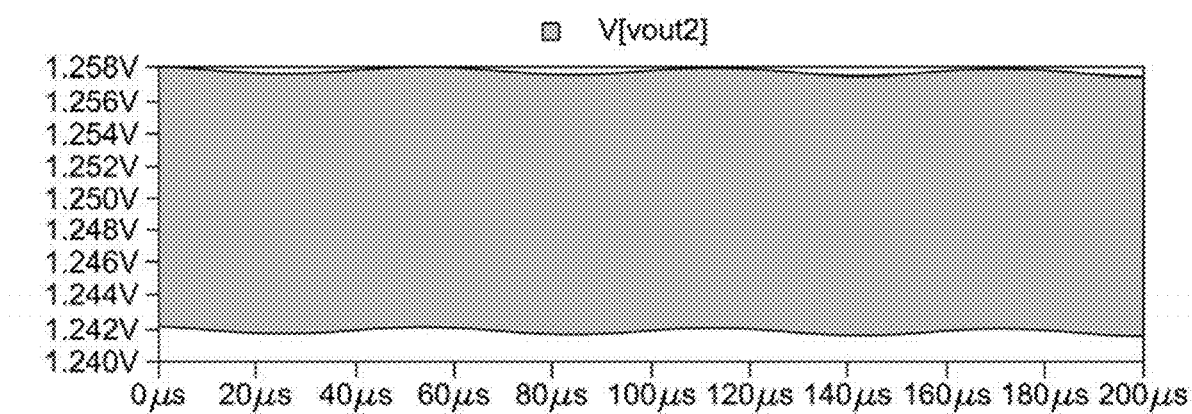
FIG. 12 shows the multi-level data signal after going through a high pass filter.

FIG. 12 shows the multi-level data signal after going through a 300 KHz high pass filter. It is apparent that the effects of multi-level modulation of the data signal can be easily filtered out. The resulting amplitude of the data signal after filtering is stable enough so that pulse amplitude modulation techniques (PAM-N) can be used to improve the data rate. This is in stark contrast to the single level modulation technique where, as shown in FIG. 8, the beacon tone effects are not easily filtered out.

Figure 13:
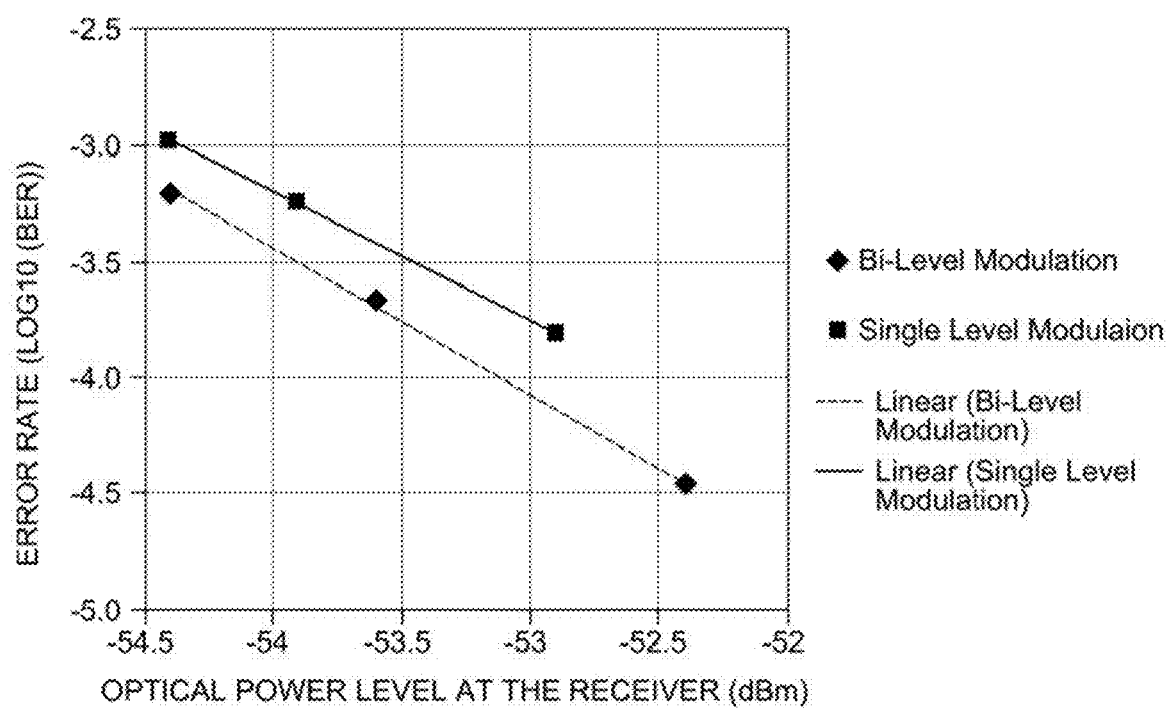
FIG. 13 is a graph illustrating an example comparison of receiver sensitivity.

Lab test results show that the multi-level modulation technique significantly improves receiver sensitivity. FIG. 13 is a graph illustrating an example comparison of receiver sensitivity. Receiver sensitivity improvement may be realized by using the multi-level modulation technique instead of the single level modulation technique. At a bit error rate (BER) of $10^{-3.2}$ the sensitivity improvement was about 0.4 dB and at a BER of $10^{-3.8}$ the improvement was about 0.5 dB. The prototype hardware was run with a data rate of 70 Mbps, a beacon tone of 17 KHz and a modulation depth (Dav) of about 0.16.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
   receiving data;
   modulating the data to generate a modulated data signal, wherein the modulated data signal comprises a first level modulated with a first beacon tone and a second level modulated with one or more of the first beacon tone or a second beacon tone, and wherein the second level is modulated in phase with the first level; and
   transmitting an optical signal comprising the modulated data signal.

2. The method of claim 1, wherein the first level is separated from the second level by a fixed direct current voltage bias.

3. The method of claim 1, wherein transmitting the optical signal comprises transmitting the optical signal in free space.

4. The method of claim 1, wherein receiving the data comprises receiving one or more of a data signal, a data stream, or a data file.

5. The method of claim 1, further comprising applying pulse amplitude modulation to one or more of the data, the modulated data signal, or the optical signal.

6. The method of claim 1, wherein a total power level of the optical signal remains constant while an amplitude of one or more of the first beacon tone or the second beacon tone varies.

7. The method of claim 1, wherein a swing of the optical signal remains constant while an amplitude of one or more of the first beacon tone or the second beacon tone varies.

8. A device comprising:
   a modulator configured to:
      receive data; and
      modulate the data to generate a modulated data signal, wherein the modulated data signal comprises a first level modulated with a first beacon tone and a second level modulated with one or more of the first beacon tone or a second beacon tone, and wherein the second level is modulated in phase with the first level; and
   an optical terminal configured to transmit an optical signal comprising the modulated data signal.

9. The device of claim 8, wherein the first level is separated from the second level by a fixed direct current voltage bias.

10. The device of claim 8, wherein the optical terminal being configured to transmit the optical signal comprises the optical terminal being configured to transmit the optical signal in free space.

11. The device of claim 8, wherein the data comprises one or more of a data signal, a data stream, or a data file.

12. The device of claim 8, wherein the modulator is further configured to apply pulse amplitude modulation to one or more of the data, the modulated data signal, or the optical signal.

13. The device of claim 8, wherein a total power level of the optical signal remains constant while an amplitude of one or more of the first beacon tone or the second beacon tone varies.

14. The device of claim 8, wherein a swing of the optical signal remains constant while an amplitude of one or more of the first beacon tone or the second beacon tone varies.

15. A system comprising:
   an optical transmitter configured to:
      receive data;
      modulate the data to generate a modulated data signal, wherein the modulated data signal comprises a first level modulated with a first beacon tone and a second level modulated with one or more of the first beacon tone or a second beacon tone, and wherein the second level is modulated in phase with the first level; and
      transmit an optical signal comprising the modulated data signal; and
   an optical receiver configured to:
      receive the optical signal, and
      filter one or more of the first beacon tone or the second beacon tone from the optical signal.

16. The system of claim 15, wherein the optical receiver is configured to filter one or more of the first beacon tone or the second beacon tone from the optical signal by using a high pass filter.

17. The system of claim 15, wherein the data comprises one or more of a data signal, a data stream, or a data file.

18. The system of claim 15, wherein the optical transmitter is further configured to apply pulse amplitude modulation to one or more of the data, the modulated data signal, or the optical signal.

19. The system of claim 15, wherein a total power level of the optical signal remains constant while an amplitude of one or more of the first beacon tone or the second beacon tone varies.

20. The system of claim 15, wherein a swing of the optical signal remains constant while an amplitude of one or more of the first beacon tone or the second beacon tone varies.

* * * * *